(12) United States Patent
Wilson et al.

(10) Patent No.: US 11,518,127 B2
(45) Date of Patent: Dec. 6, 2022

(54) METHOD TO ASSEMBLE UNCURED SPOKE OF NON-PNEUMATIC TIRE

(71) Applicant: Compagnie Generale des Etablissements Michelin, Clermont-Ferrand (FR)

(72) Inventors: Brian D Wilson, Greer, SC (US); Imthiaz Ameerdheen, Chennai (IN); Murugan Muthupandian, Chennai (IN); Prakash Arunachalam, Chennai (IN); Peer Ibrahim Ali Mohamed Kasim, Chennai (IN)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 17/312,169

(22) PCT Filed: Dec. 5, 2019

(86) PCT No.: PCT/US2019/064703
§ 371 (c)(1),
(2) Date: Jun. 9, 2021

(87) PCT Pub. No.: WO2020/131405
PCT Pub. Date: Jun. 25, 2020

(65) Prior Publication Data
US 2022/0009186 A1      Jan. 13, 2022

Related U.S. Application Data

(60) Provisional application No. 62/782,827, filed on Dec. 20, 2018.

(51) Int. Cl.
| | |
|---|---|
| B60B 9/26 | (2006.01) |
| B29D 30/02 | (2006.01) |
| B60C 7/14 | (2006.01) |

(52) U.S. Cl.
CPC .............. *B29D 30/02* (2013.01); *B60C 7/143* (2013.01); *B60B 9/26* (2013.01); *B60B 2320/12* (2013.01)

(58) Field of Classification Search
CPC .......... B29D 30/02; B60C 7/143; B60B 9/26; B60B 2320/12
See application file for complete search history.

(56) References Cited

U.S. PATENT DOCUMENTS

| | | |
|---|---|---|
| 2007/0144092 A1 | 6/2007 | Swiszcz et al. |
| 2018/0022147 A1 | 1/2018 | Tien |

(Continued)

FOREIGN PATENT DOCUMENTS

| | | | |
|---|---|---|---|
| DE | 202007007708 U1 | 8/2007 | |
| FR | 2935927 A1 | 3/2010 | |
| WO | WO-2017072562 A1 * | 5/2017 | ........... B60B 1/0261 |

OTHER PUBLICATIONS

European Patent Office, International Search Report dated Feb. 17, 2020, pp. 1 to 11 (included), European Patent Office, Rijswijk, Nethedands.

*Primary Examiner* — Nirvana Deonauth
(74) *Attorney, Agent, or Firm* — Neal P. Pierotti

(57) ABSTRACT

A method for assembling an uncured spoke is provided. The method includes the assembly of a panel (14), a first foot (24), and a second foot (26) of the uncured spoke. The first foot (24) and the second foot (26) are complexed onto the panel (14), and the panel extends continuously from the first foot to the second foot.

11 Claims, 12 Drawing Sheets

(56) References Cited

U.S. PATENT DOCUMENTS

| | | |
|---|---|---|
| 2018/0345610 A1 | 12/2018 | Delfino et al. |
| 2018/0345718 A1 | 12/2018 | Delfino et al. |
| 2019/0337329 A1 | 11/2019 | Cron et al. |

\* cited by examiner

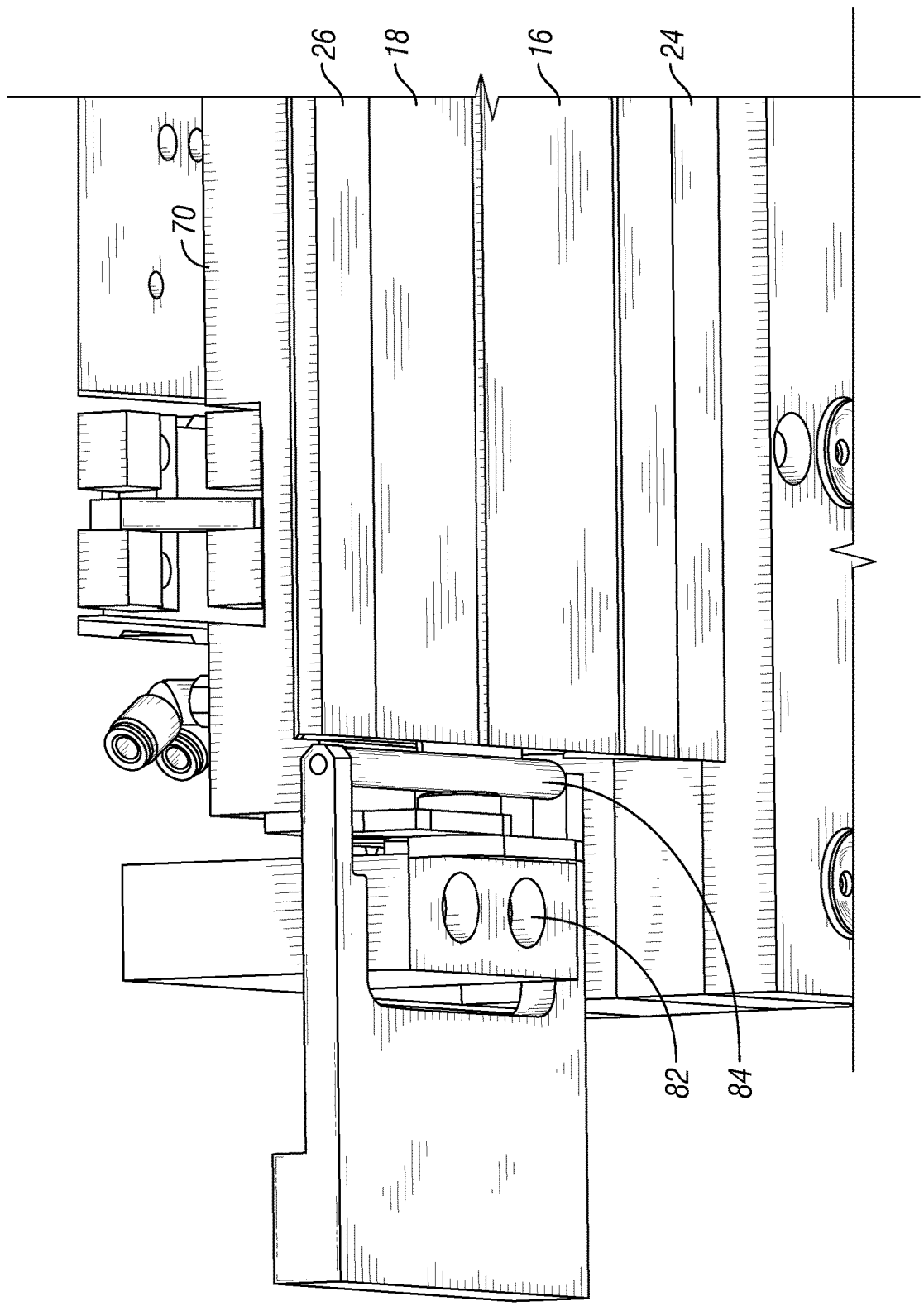

METHOD TO ASSEMBLE UNCURED SPOKE OF NON-PNEUMATIC TIRE

CROSS-REFERENCE TO RELATED APPLICATIONS

The present application is a 35 U.S.C. § 371 application of PCT/US19/64703 filed on Dec. 5, 2019 and entitled "Method to Assemble Uncured Spoke of Non-Pneumatic Tire," PCT/US19/64707 claims priority to United States Provisional Patent Application No. 62/782,827 filed on Dec. 20, 2018. PCT/US19/64703 and U.S. Provisional Application No. 62/782,827 are incorporated by reference herein in their entireties for all purposes,

FIELD OF THE INVENTION

The subject matter of the present invention relates to a method for manufacturing a spoke used in the construction of a non-pneumatic tire. More particularly, the present application involves a method that employs complexing various components of the spoke together to form an uncured spoke of a non-pneumatic tire for subsequent curing by a mold.

BACKGROUND OF THE INVENTION

Non-pneumatic tires are those that do not require air or other fluid for their inflation for use. Some non-pneumatic tires have a plurality of spokes arranged circumferentially around and attached to a hub. On their opposite end, the spokes are attached to a shear band. To build the spoke components of the non-pneumatic tire, it is known to combine together uncured sections of the spoke to form a green, uncured spoke which is subsequently cured through use of a mold and heat. One such method of producing a green, uncured spoke is shown and described with reference to application number PCT/US17/68679 filed on Dec. 28, 2017 and entitled, "End Effector with Pivoting Arrangement for Construction of Spoke of Non-Pneumatic Tire," the entire contents of which are incorporated herein in their entirety for all purposes. In this method, a flat fixture is provided and various uncured spoke components are supplied onto this fixture. A pick and place device such, such as a pivoting end effector, can be used to pick the uncured spoke components up from a supply conveyor or other transport means and place the picked up components onto the flat fixture. Once the desired number of components have been assembled onto the flat fixture, the end effector can pick them up and move them to a second form, that is not flat, onto which a nose component of the spoke rests. The end effector can fold the variously assembled uncured components around and onto the nose component. This assembly can then be lifted by the end effector off of the second form and then placed onto a conveyor or otherwise transported to a mold for curing. Although capable of assembling a green, uncured spoke, additional methods of making a multi-component green, uncured spoke are desired. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 16 is a perspective view of the end effector holding a subassembly with the roller engaging the second nose layer.

The use of identical or similar reference numerals in different figures denotes identical or similar features.

DETAILED DESCRIPTION OF THE INVENTION

Figure 1:
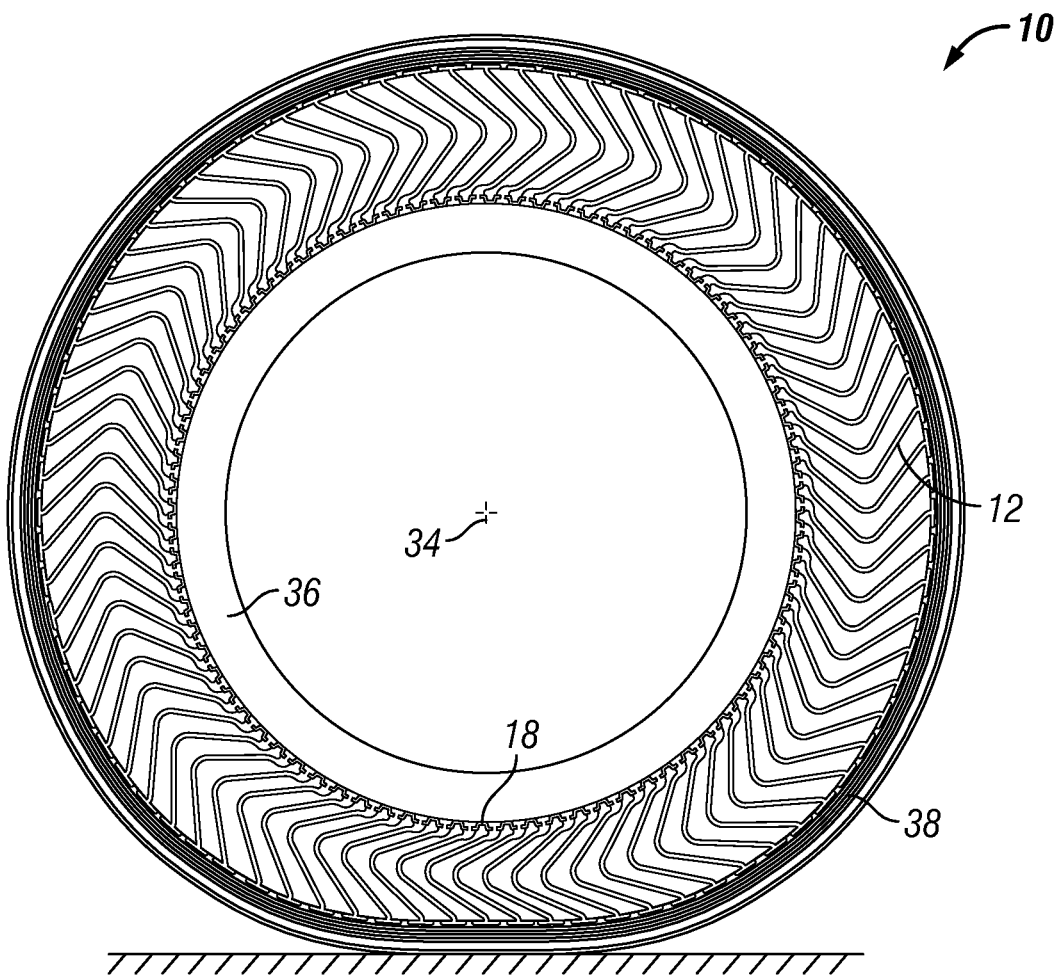
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a method of manufacturing a spoke 12 used in the construction of a non-pneumatic tire 10. The spoke 12 formed via the method is an uncured spoke that is subsequently moved to a mold. In the mold, heat and pressure is applied to the spoke 12 for curing, and the cured spoke is subsequently assembled with the other components of the non-pneumatic tire 10. The method of producing the uncured spoke 12 utilizes a complexing process in which components making up the spoke 12 are continuously fed and joined together. Components making up the spoke are folded and pressure is applied via rollers, and once certain components are assembled a desired width of the sub-assembly is cut to a length that represents the final depth size of the spoke. An end effector can also be used to add additional components to this spoke sub-assembly, and folding via rollers on the end effector can complete the uncured spoke assembly process. It is to be understood that as used herein, an uncured spoke can be referred to as a green spoke and that these two terms are interchangeable and refer to the spoke before molding with the application of heat and pressure.

FIG. 1 shows a non-pneumatic tire 10. The non-pneumatic tire 10 has an axis 34 at its center, and the radial direction extends from the axis 34. Tread is located on the outer exterior of a shear band 38 and extends all the way around the non-pneumatic tire 10 in the circumferential direction. The shear band 38 is located inward in the radial direction from the tread and likewise extends 360 degrees around the axis 34 in the circumferential direction. A series of spokes 12 engage the shear band 38 and extend inward in the radial direction from the shear band 38 to a hub 36 of the non-pneumatic tire 10. Any number of spokes 12 can be present, and their cross-sectional shape can be different from that shown. In some instances, between 64-80 spokes 12 are present in the non-pneumatic tire 10. The hub 36 is located inward from the spokes 12 in the radial direction and can be mounted onto a wheel of the vehicle. The spokes 12 at the top of the non-pneumatic tire 10 are in tension, and the spokes 12 at the bottom are in compression as the non-pneumatic tire 10 rests on the ground and as the non-pneumatic tire 10 turns in normal operation of the vehicle.

Figure 2:
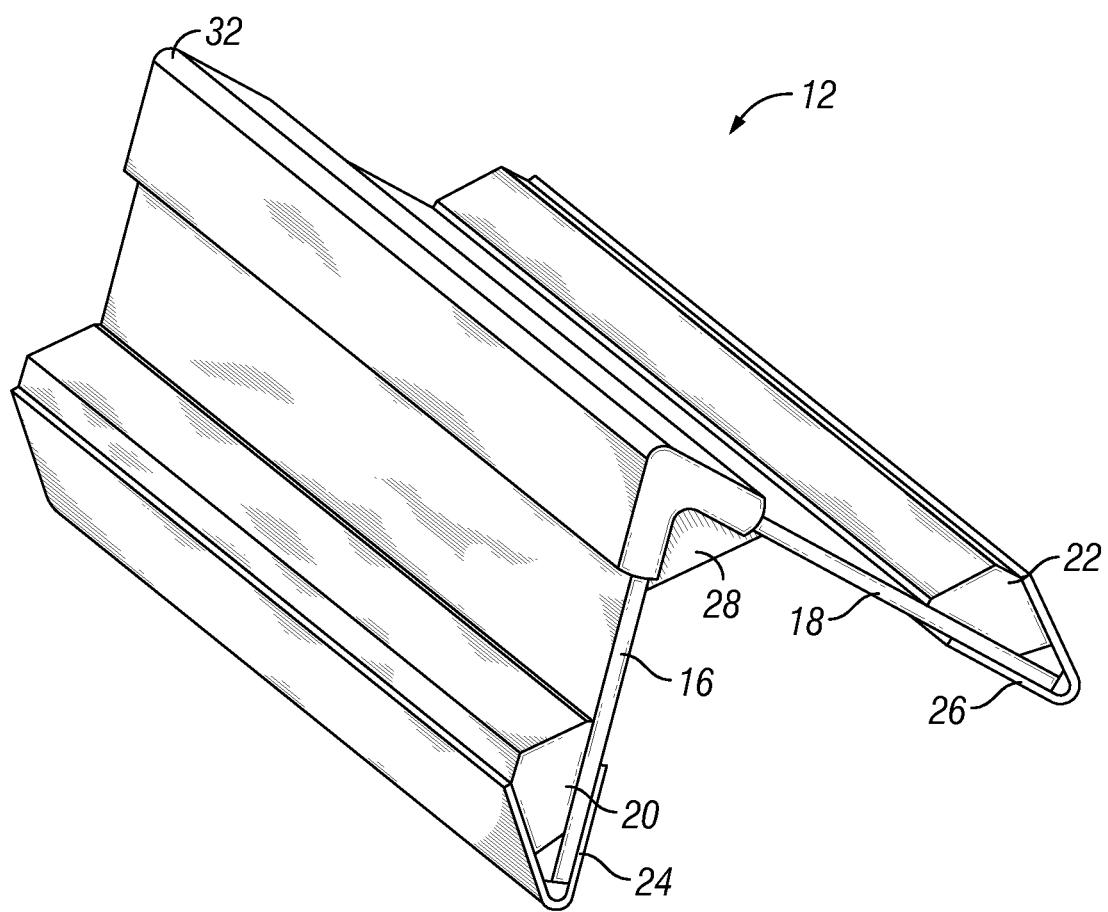
FIG. 2 is a perspective view of a spoke of a non-pneumatic tire in one embodiment.

The spoke 12 is shown in FIG. 2 and includes a pair of legs with feet at ends of the spoke 12. The central body of the spoke 12 has a generally triangular shaped cross-section and is referred to as a nose. The spoke 12 shown is the uncured, green spoke 12 produced from the disclosed method and is made out of multiple components. Each one of these components can include different materials, or can have the same materials in different amount or in the same amount. Rubber, fiberglass, urethane, polyurethane and other materials may be present in the components used to assemble the spoke 12. The components of the spoke 12 include a first panel 16 and a second panel 18 that make up the legs of the spoke 12. The first panel 16 has the first foot 20 on one end and a first foot layer 24 at least partially surrounds the first foot 20. The second panel 18 in turn has a second foot 22 on one end and a second foot layer 26 at least partially surrounds this second foot 22. A nose 28 is present under the spoke 12 and engages along a majority of its length both of the panels 16, 18. On an opposite of the spoke 12 from the nose 28, a first nose layer 30 is present and engages both panels 16, 18 along its length. A second nose layer 32 is laid on top of the first nose layer 30 and has ends that fold under the nose 28 and engage the panels 16, 18. It is to be understood that the shape and size of the spoke 12 formed by the process can be varied in accordance with different exemplary embodiments, and that a variety of spoke 12 configurations are possible. The spoke 12 extends from a first end to a second end, to achieve a width 40 of the spoke 12, and may have an extension from end to end greater than, less than, or the same as the height of the spoke 12.

Figure 3:
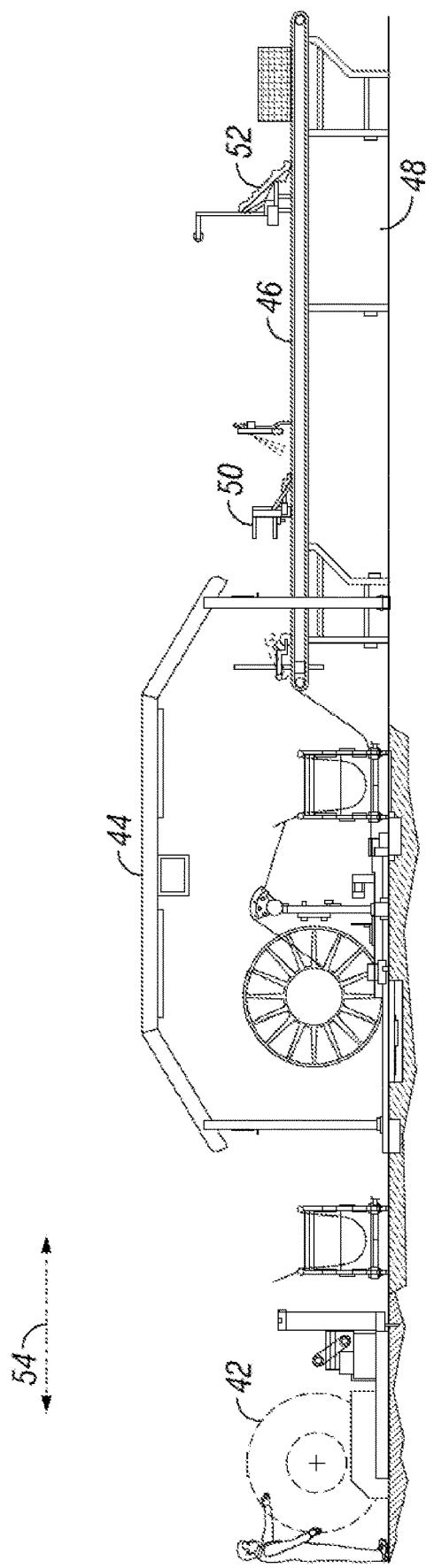
FIG. 3 is a side view of machinery capable of executing the beginning steps of a process of constructing a spoke for a non-pneumatic tire.
Figure 4:
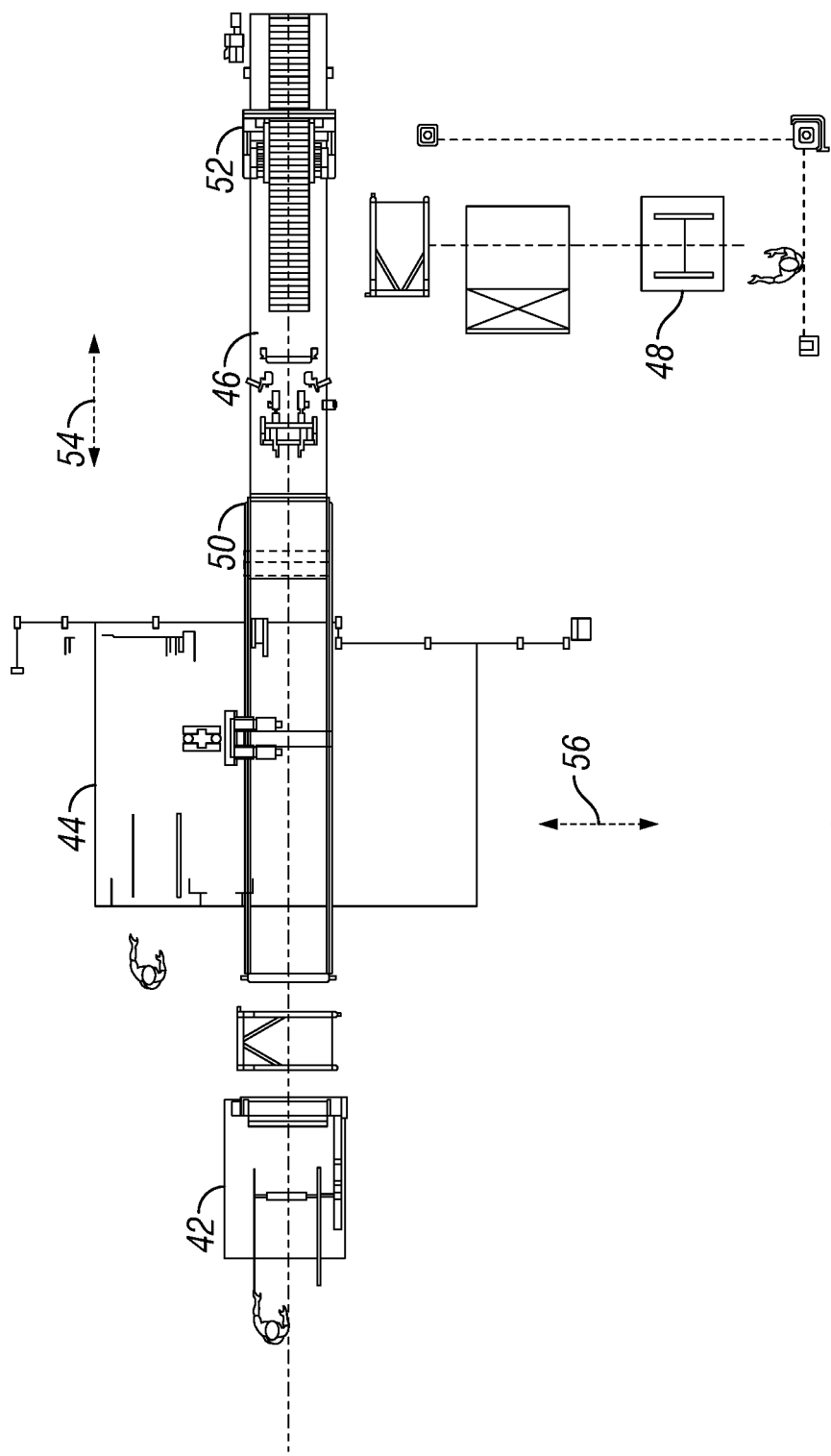
FIG. 4 is a top view of FIG. 3.

The process of constructing the spoke 12 includes a number of stations that supply, complex and otherwise process the material and subassemblies into the final form of the green spoke 12. FIGS. 3 and 4 show stations that make up the first stages of the assembly process with FIG. 3 being a top view and FIG. 4 being a side view of FIG. 3. Foot layer unwinding station 42 is shown and includes one or more bobbins onto which material making up the first and second foot layers 24, 26 is wound. Although described as being supplied on bobbins, it is to be understood that the various components used in the construction of the spoke 12 could also be supplied to the machinery conducting the assembly process via extrusion. A panel unwinding station 44 is also present and includes a bobbin onto which a panel 14 is wound. A primary conveyor 46 is present and is downstream from both stations 42, 44 and has a belt that moves in the machine direction. The primary conveyor 46 could be a belt, rollers, a combination of belts and rollers, or any other mechanism capable of moving the components downstream. The foot layer unwinding station 42 and the panel unwinding station 44 are in line with the primary conveyor 46. The figures include a length direction 54 and a perpendicular width direction 56. The length direction 54 may be referred to as the machine direction and is the direction the materials and components travel for complexing. The width direction 56 can be thought of as the side direction.

Figure 7:
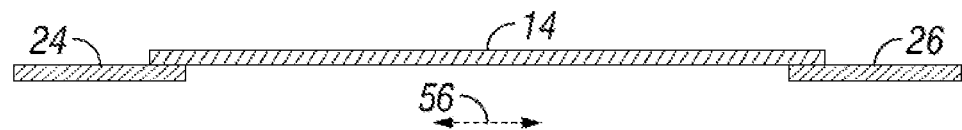
FIG. 7 is a cross-sectional view of a subassembly with first and second foot layers complexed onto a panel.

The first and second foot layers 24, 26 are routed from the foot layer unwinding station 42 to the primary conveyor 46 with a required amount of spacing between them in the width direction 56. Mechanical guides can be used to control the position of the first and second foot layers 24, 26 on the primary conveyor 46, and pressure rollers are applied to the first and second foot layers 24, 26 to avoid slippage between them and the primary conveyor 46. The panel 14 is supplied from the panel unwinding station 44 to the primary conveyor 46, and dynamic centering is used to ensure proper positioning of the panel 14 with respect to the primary conveyor 46. A foot layer and panel complexing station 50 is present on the primary conveyor 14. The foot panel 14 is complexed on the primary conveyor 46 over the first and second foot layers 24, 26 and a pressure roller is applied to push these components 24, 26, 14 together at the foot layer and panel complexing station 50. The various green spoke components that are assembled via the disclosed process have a natural stickiness/tackiness to them so that they will exhibit some amount of adhesion even though they are not cured. Pressure applied to the sticky components will further enhance their adhesion with one another. As such, the components can be pushed together and may remain attached via their natural tackiness throughout the build process. The subassembly of the first and second foot layers 24, 26 with the panel 14 is illustrated with reference to FIG. 7.

Figure 8:
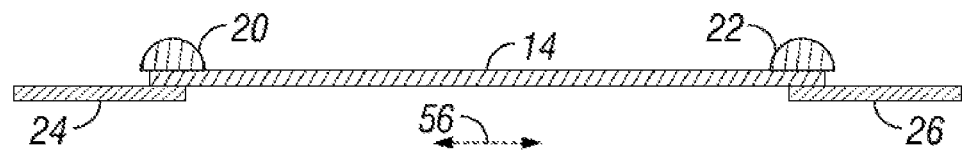
FIG. 8 is a cross-sectional view of the subassembly with first and second feet complexed onto the panel.
Figure 9:
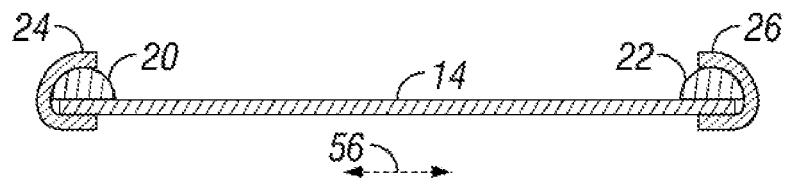
FIG. 9 is a cross-sectional view of the subassembly with the first and second foot layers folded.

A foot unwinding station 48 is downstream from the foot layer and panel complexing station 50. The foot unwinding station 48 is positioned perpendicular to the length direction 54. The foot unwinding station 48 includes bobbins onto which the first foot 20 and the second foot 22 are wound. The feet 20, 22 are unwound from the foot unwinding station 48 and transported in the width direction 56 to the primary conveyor 46. Upon approach to the primary conveyor one or more rollers or other mechanical guides are employed to turn the transport direction of the feet 20, 22 from the width direction 56 to the length direction 54. Dynamic centering is used to ensure proper positioning of the feet 20, 22 relative to the edges of the panel 14. As described herein, the term "dynamic centering" is positioning of the component in the process using mechanical or visual means to determine positioning and then using mechanical means such as roller to properly position the component. A foot complexing station 52 is present downstream from the foot layer and panel complexing station 50 to complex the feet 20, 22 with the subassembly of the panel 14 and foot layers 24, 26. At the foot complexing station 52, the feet 20, 22 are placed onto the panel 14 and this subassembly is shown in FIG. 8. After placement of the feet 20, 22 or simultaneously therewith, the process at the foot complexing station 52 also functions to turn up the foot layers 24, 26. This turn up is shown with reference to FIG. 9. In this regard, the first foot layer 24 remains engaged to the bottom of the panel 14, but is wrapped up and covers a portion of the first foot 20.

Similarly, the second foot layer 26 remains in engagement with the panel 14 and is wrapped up and covers a portion of the second foot 22. A series of rollers is used at the foot complexing station 52 to accomplish turn up of the first and second foot layers 24, 26. Pressure rollers may be used to push the feet 20, 22 against the panel 14, and pushing the first and second foot layers 24, 26 against the feet 20, 22, to ensure a connection stronger than that achieved by just placement onto the panel 14 with the natural tackiness. Up to this point in the assembly process, the panel 14 is a single piece and is not slit into two pieces and extends in the width direction 56 continuously from the first foot/layer 20, 24 to the second foot/layer 22, 26.

Figure 18:
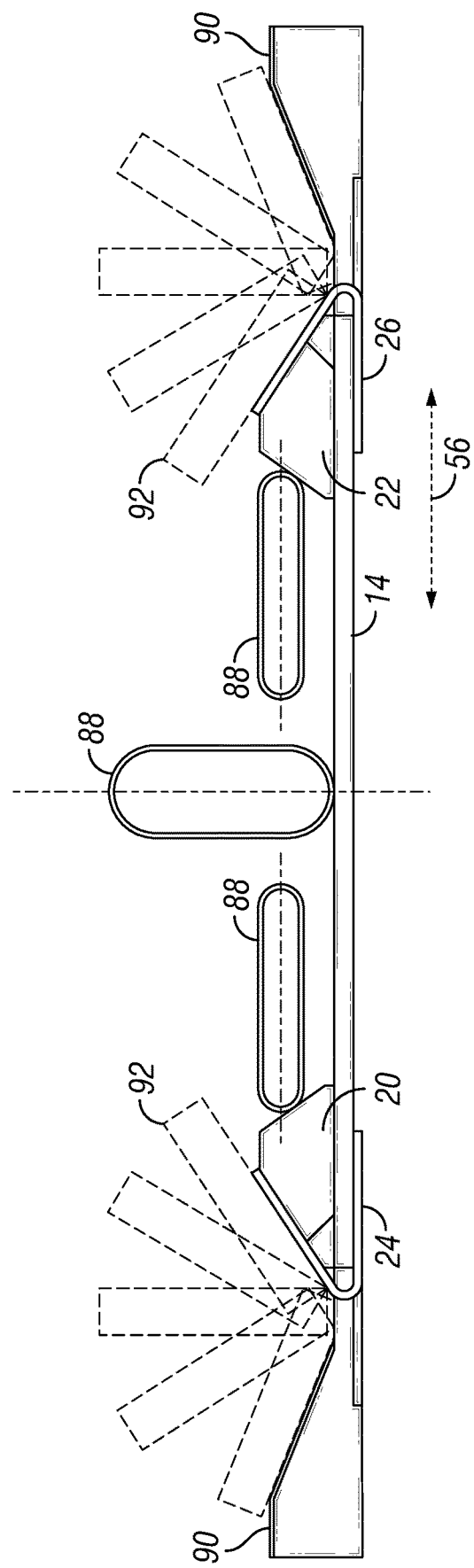
FIG. 18 is a front view of a turn up of first and second foot layers.

FIG. 18 shows one manner of effecting the turn up as disclosed. Here, rollers 88 push down onto the panel 14 and the feet 20, 22 to keep them in position for the turn up. Wedges 90 one either side of the subassembly in the width direction 56 can engage the first foot layer 24 and the second foot layer 26 to initially lift them up off of the surface of the primary conveyor 46. As the subassembly moves downstream in the length direction 54, a series of rollers 92 engage the layers 24, 26 in sequence and function to turn them up onto the feet 20, 22. Additional arrangements of folding the first and second foot layers 24, 26 are possible in other embodiments.

Figure 5:
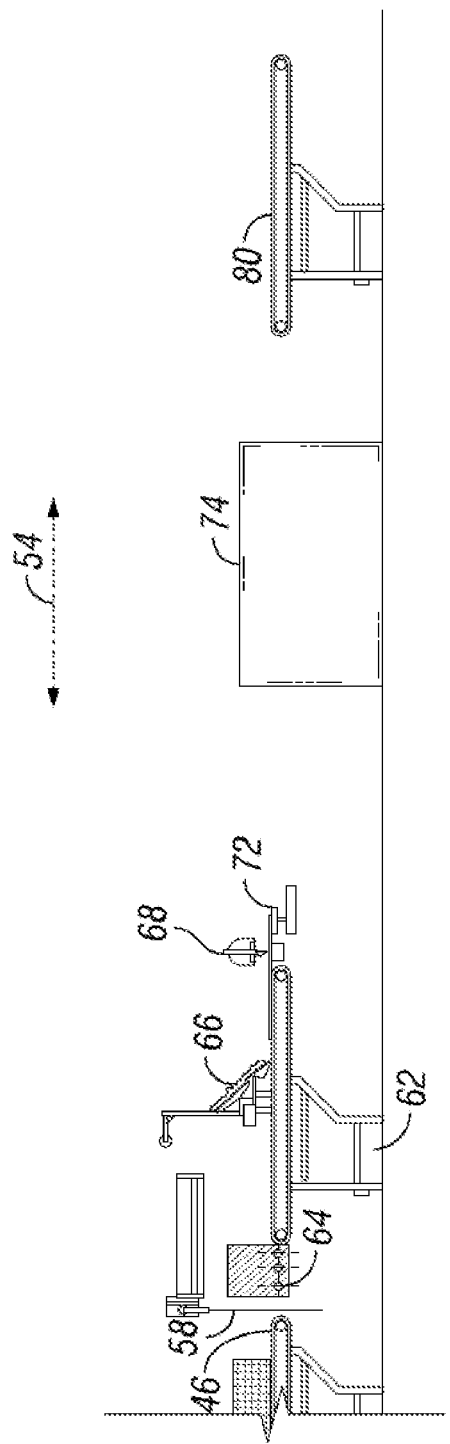
FIG. 5 is a side view of machinery capable of executing the ending steps of a process of constructing the spoke of a non-pneumatic tire.
Figure 6:
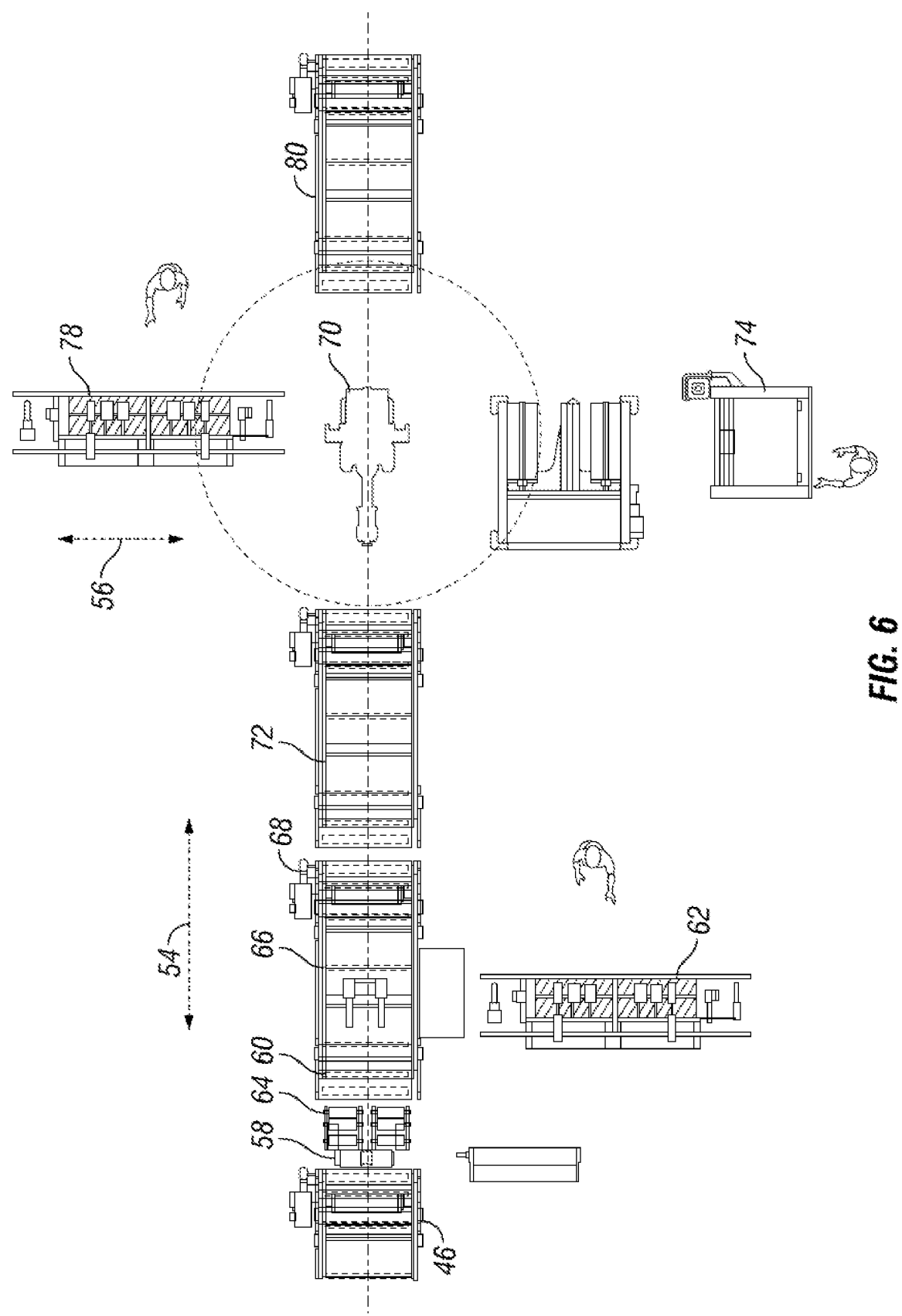
FIG. 6 is a top view of FIG. 5.

FIGS. 5 and 6 show downstream portions of the assembly process from that previously described with FIG. 6 being a top view of the side view of FIG. 5. After the turn up to achieve the subassembly of FIG. 9, a cutter 58 is employed to cut this subassembly down the length of the subassembly such that the cutter 58 creates a cut in the length direction 54. The cutter 58 may be a laser cutter and can be present just off of the end of the primary conveyor 46. A space may exist in the length direction 54 between the primary conveyor 46 and a secondary conveyor 60 that is downstream in the machine direction from the primary conveyor 46. The secondary conveyor 60 at the cutter 58 is not a belt. Rollers can be used to hold down the subassembly at the cutter 58 so that the cutter splits the subassembly into two separate pieces. A wedge profile partition is present to separate the two pieces of the cut subassembly in the width direction 56 as the subassembly moves downstream in the length direction 54. Guiding rollers on either side are used to support the cut subassembly and move it to the desired width position. Multi-directional rollers 64 are present at the wedge profile partition to allow the cut subassembly to move in both the length direction 54 and the width direction 56. Multi-direction rollers 64 have rollers that allow movement/rolling in both length and width 54, 56 directions. The multi-directional rollers 64 thus afford movement in these two directions so that material thereon can be moved not just length 54 wise but also width 56 wise. The multi-directional rollers 64 are present at the wedge profile partition such that they share some of the same locations in the length direction 54.

Figure 10:
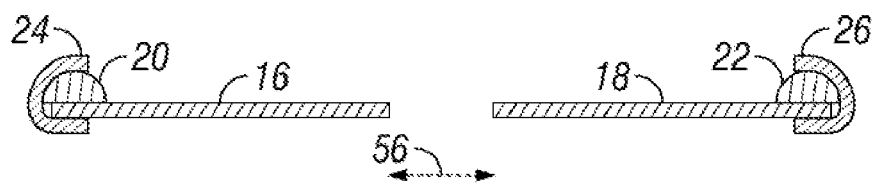
FIG. 10 is a cross-sectional view of the subassembly with the panel cut.

The subassembly after cutting by the cutter 58 and separation via the wedge, multi-directional roller 64 and guide rollers is shown with reference to FIG. 10. As shown, the sub-assembly is now two separate pieces spaced completely from one another in the width direction 56. This cutting separates the panel 14 into a first panel 16, that engages the first foot 20 and the first foot layer 24, and a second panel 18 that in turn engages the second foot 22 and the second foot layer 26. No new material or components are added in this cutting process in which the subassembly is cut into two pieces. The separation at this point does not employ a secondary conveyor 60 with belts but instead includes rollers and an open area underneath. The cut subassembly may then be passed to the belt portion of the secondary conveyor 60. As such, the primary conveyor 46 may be a belt at all points, and the secondary conveyor 60 may have a belt portion and a roller portion such that it is not a belt at all points.

Figure 11:
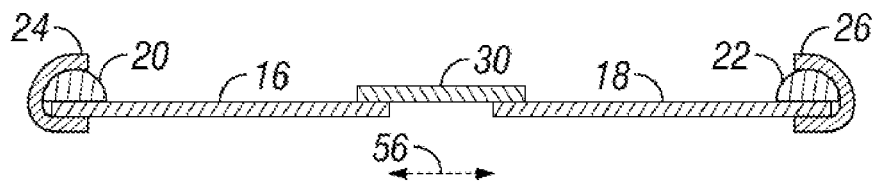
FIG. 11 is a cross-sectional view of a first nose layer on the first and second panels.

A first nose layer unwinding station 62 is present downstream from the cutter 58 in the length direction 54, and is positioned perpendicular to the secondary conveyor 60. The first nose layer 30 is wound onto a bobbin at the first nose layer unwinding station 62 and is unwound and moves in the width direction 56 to the secondary conveyor 60. The first nose layer 30 is turned 90 degrees from the width direction 56 to travel on the length direction 54 by way of rollers or other mechanical members. Dynamic centering is used to control the position of the first nose layer 30 relative to the surface of the secondary conveyor 60 or to the subassembly carried by the secondary conveyor 60. Profiled pressure rollers can be used to complex the subassembly of FIG. 10 with the first nose layer 30 to thus apply the first nose layer 30 to the first panel 16 and second panel 18 at a first nose layer station 66. FIG. 11 shows the subassembly at this stage of development in which the first nose layer 30 bridges the first and second panels 16, 18 and engages both of them on a single side. The subassembly can now be thought of as being a single piece once the first nose layer 30 is applied thereto to reattach the pieces 16, 18. The first and second panels 16, 18 can still be thought of as separate components instead of a single panel 14 at this point in the subassembly and moving forward.

A cutting station 68 is downstream from the first nose layer station 66 in the length direction 54. The first and second panels 16, 18 may include a plurality of fiberglass cables that are oriented so as to run in the width direction 56. A vision system at the cutting station 68 below the surface of the secondary conveyor 60 monitors the first and second panels 16, 18 and positions the cutter at the cutting station 68, or controls the movement of the secondary conveyor 60 relative to the cutter, or both so that the cut to the first and second panels 16, 18 occurs between two successive cables of the first and second panels 16, 18. The cutting station 68 functions to ensure first and second panel 16, 18 monofilaments are aligned with one another and cut therebetween. If a blade is used to cut the first and second panels 16, 18 then it may be sized relative to the monofilaments to allow it to find a position between them so that the monofilaments themselves are not cut, but instead the material between them are cut. Additionally or alternatively, positioning with the vision system may ensure the material between the monofilaments and not the monofilaments are cut. The cutter at the cutting station 68 may be a laser or may be a mechanical blade.

The subassembly is cut at the cutting station 68 so that the cut extends in the width direction 56 and not in the length direction 54. A cut is made and the subassembly advanced in the length direction 54 and another cut in the width direction 56 is made as such a point that a desired width/length of the subassembly is obtained. It is to be understood that up until this point the subassembly is described in terms of a length moving forward. Now, cutting of the subassembly in the width direction 56 results in an amount of final subassembly product that has a particular resulting width. Thus the width of the final spoke 12 product does not have the same meaning as the width direction 56 of the machinery constructing the subassemblies of the final spoke 12 product.

After the cutting station 68, the belt of the secondary conveyor 60 ends downstream in the length direction 54 and the product is directed off of the belt of the secondary conveyor 60 to an indexing fixture 72. The indexing fixture 72 can reciprocate backwards and forwards in the length direction 54. The cut to width subassembly is placed onto the indexing fixture 72 and the indexing fixture 72 moves downstream in the length direction 54 so that a space exists between the indexing fixture 72/cut subassembly and the upstream cutting station 68/secondary conveyor 60 belt. Pressure rollers are used to ensure traction between the surface of the secondary conveyor 60 belt and the cut subassembly. After moving the cut subassembly a short distance in the length direction 54, the indexing fixture 72 stops. The reason the indexing fixture 72 is moved away from the primary conveyor 46 and stopped is to create an empty space. Turning now momentarily to FIG. 16, the end effector 70 has an end effector portion 82 that extends downward past the engagement surface 86 and the subassembly held by the end effector 70. When the end effector 70 engages the subassembly on the indexing fixture 72, this downward extending end effector portion 82 goes into the empty space just created by the indexing fixture 72 so that the subassembly can be grasped and held onto the engagement surface 86. If this space by the indexing fixture 72 were not created, then the projecting end effector portion 82 would hit the primary conveyor 46/secondary conveyor 60/indexing fixture 72 and interference would result so that the subassembly would not be able to be grasped.

Figure 12:
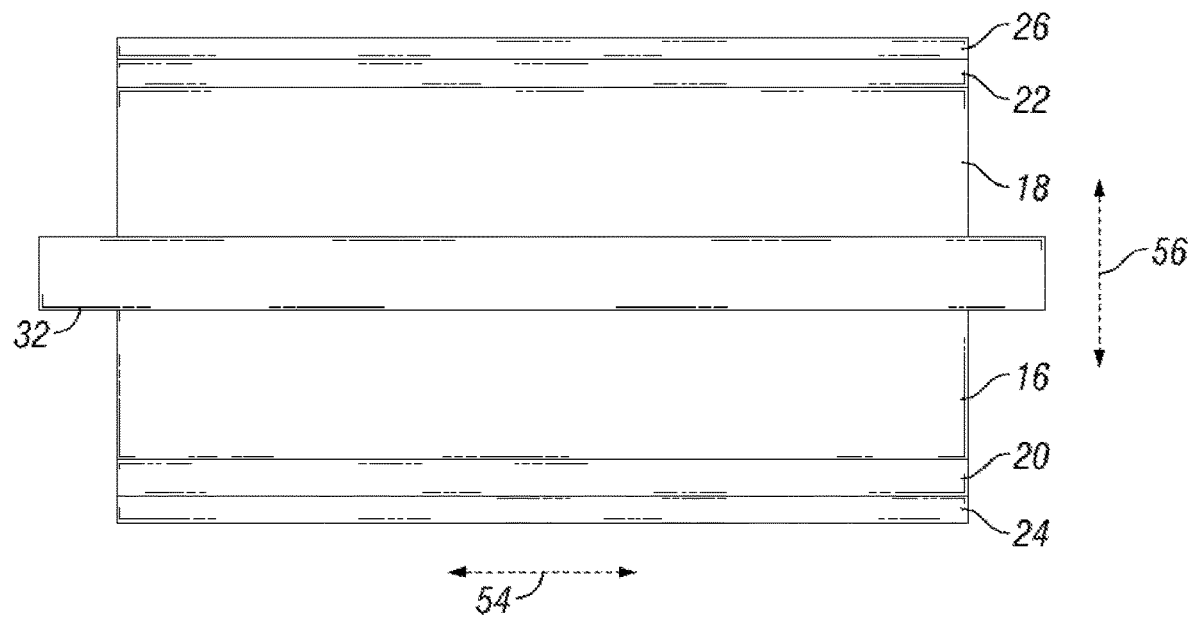
FIG. 12 is a top view of subassembly with the second nose layer on the first nose layer.

The process includes a second nose layer unwinding station 74 at which the second nose layer 32 is wound on a bobbin. The second nose layer 32 may be unwound from the bobbin and cut to a desired length which is longer than the width of the previously cut subassembly. The second nose layer unwinding station 74 and cutting posts for cutting the second nose layer 32 are perpendicular to the machine direction of the secondary conveyor 60. A robot having an end effector 70 is located downstream of the indexing fixture 72 and retrieves the cut piece of second nose layer 32. This picked up second nose layer 32 piece is transported to the cut subassembly and placed directly over the first nose layer 30 with ends extending beyond each side of the cut subassembly. FIG. 12 shows the second nose layer 32 positioned onto the first nose layer 30 with ends extending over the sides. The ends will sag a bit as the second nose layer 32 overlays the subassembly.

On an opposite side of the robot with the end effector 70 and likewise perpendicular to the direction of travel of the secondary conveyor 60 in the length direction 54 a nose unwinding station 78 is located. The nose 28 is unwound from a bobbin at the nose unwinding station 78 and can be cut to length by a cutting post. The cut nose 28 may be placed by a second robot or other mechanism onto a nose assembly fixture 76. At this point in the assembly process, the robot with the end effector 70 may lift the subassembly shown in FIG. 12 and transport it to the nose assembly fixture 76. The end effector 70 has an engagement surface 86 that can have suction cups or vacuum capability to grasp the subassembly and lift it from the secondary conveyor 60 or other surface for transport and to hold the subassembly thereon. The vacuum or other holding feature can be released to remove the held subassembly components from the engagement surface 86.

Figure 17:
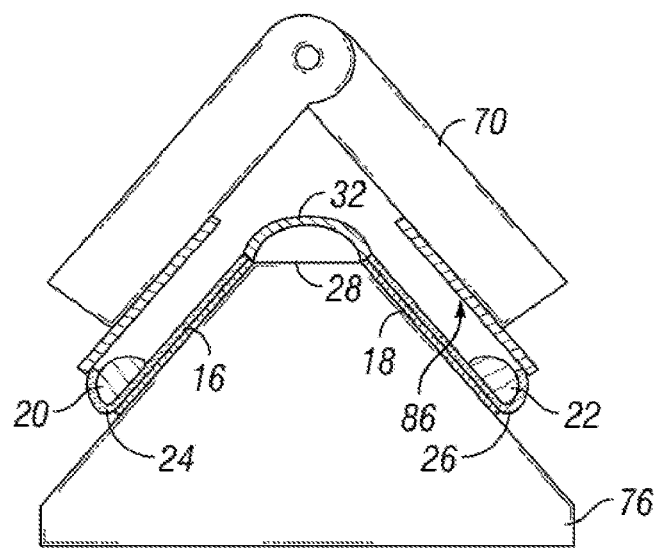
FIG. 17 is a side view of the end effector with subassembly engaging a nose on a nose assembly fixture.
Figure 13:
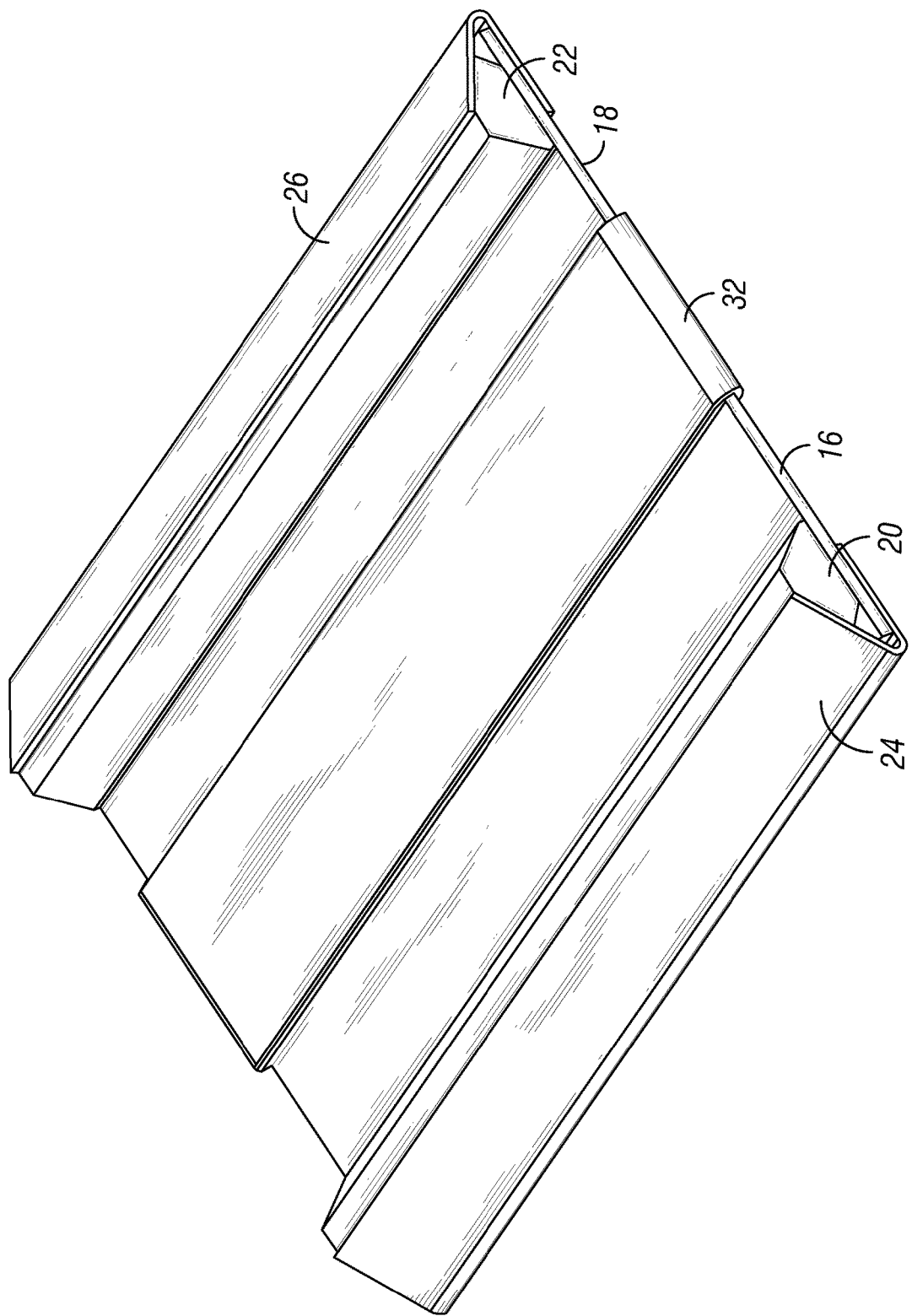
FIG. 13 is a perspective view of the subassembly with the second nose layer folded under the first and second panels.
Figure 14:
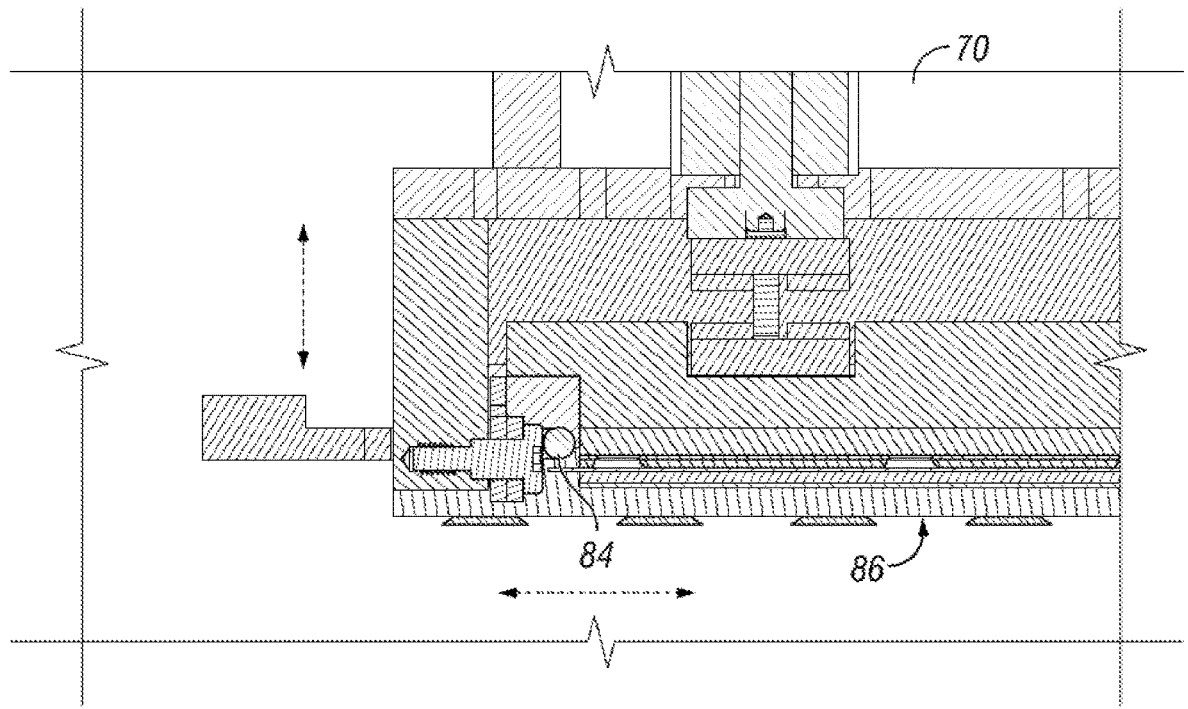
FIG. 14 is a side view of an end effector with a roller in a home position.
Figure 15:
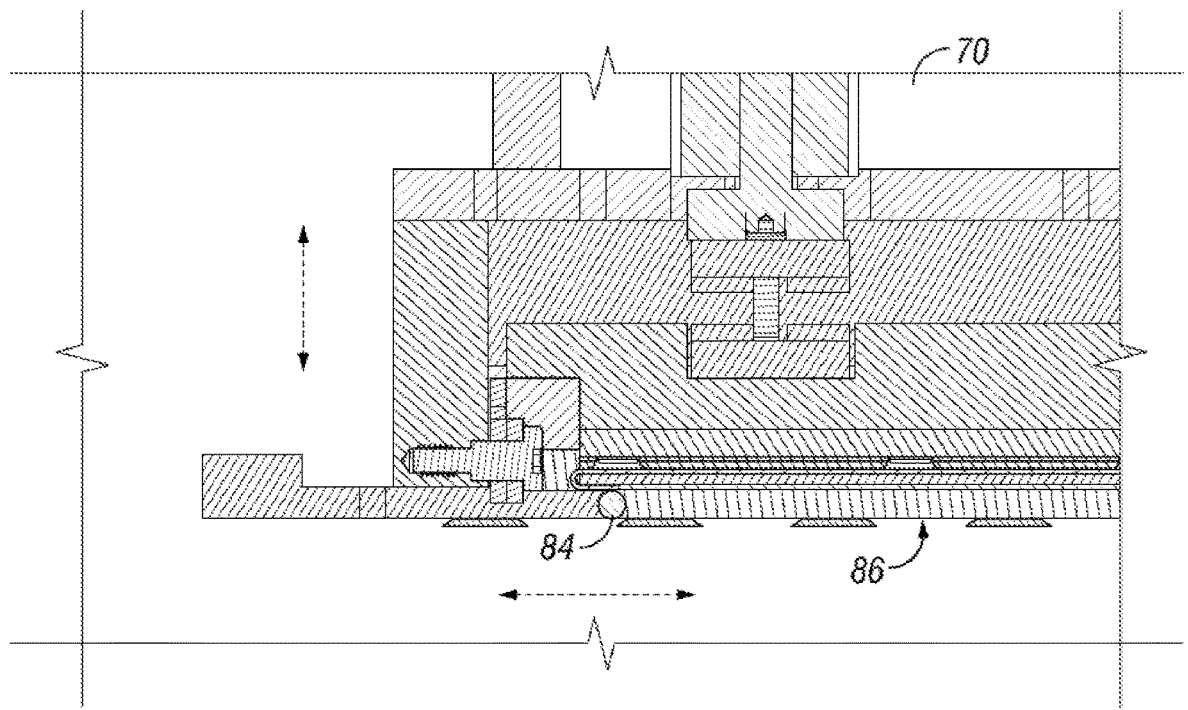
FIG. 15 is a side view of the end effector of FIG. 14 with the roller in a folding position.

During lifting and/or transport the end effector 70 folds down, via a pair of rollers 84 at the end effector 70, the second nose layer 32 under the first and second panels 16, 18. FIG. 14 is a side view of a portion of the end effector 70 that shows one of the rollers 84. The other roller 84 is not shown but is on the other side of the end effector 70. The roller 84 is in a home position in FIG. 14 in which it is out of the way and allows the engagement surface 86 to engage the subassembly and hold it thereon. The roller 84 can be moved both up and down, and sideways as indicated by the pair of arrows in FIGS. 14 and 15. In FIG. 15 the roller 84 is moved from the home position and placed into a folding position in which it is closer to the engagement surface 86. FIG. 16 shows the subassembly components grasped by the engagement surface 86 with the roller 84 in the folding position. The extending piece of the second nose layer 32 is moved into engagement with the roller 84 and the roller 84 acts on this piece to fold it under the pair of panels 16, 18. The other roller 84, not shown, functions in a similar manner on the other side of the subassembly to fold under the other overlapping piece of the second nose layer 32. This folding of the second nose layer 32 maybe when the subassembly is in a flat orientation as the roller 84 can move down and inboard to effect this folding action. The second nose layer 32 is attached to the underside of the first and second panels 16, 18 via the tackiness of the materials. FIG. 13 shows the subassembly of FIG. 12 with the ends of the second nose layer 32 folded under the first and second panels 16, 18. This subassembly with the second nose layer 32 folded is transferred to the nose assembly fixture 76 shown in FIG. 17 and is further folded down onto the nose 28 and other portions of the nose assembly fixture 76. The nose 28 engages the folded under portions of the second nose layer 32, and also engages portions of the underside of the first panel 16 and the second panel 18. The robot with the end effector 70 then lifts this now finished green spoke 12 from the nose assembly fixture 76 and transports it to an output conveyor 80 and places it thereon. The green, uncured spoke 12 is then transported by the output conveyor 80 to a mold for curing.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A method to assemble an uncured spoke, comprising:
providing a subassembly of a first foot layer, a second foot layer, and a panel;
providing a first foot;
providing a second foot;
placing the first foot and the second foot onto the panel such that the panel extends continuously from the first foot to the second foot, wherein the first foot and the second foot engage the panel;
folding the first foot layer onto the first foot, wherein the first foot layer engages the panel and wherein the first foot layer engages the first foot;
folding the second foot layer onto the second foot; and
cutting and separating the panel after the placing of the first foot and the second foot onto the panel such that the panel is made into a first panel and a second panel.

2. The method as set forth in claim 1, further comprising placing a first nose layer onto the first panel and the second panel.

3. The method as set forth in claim 2, further comprising:

applying a second nose layer onto the first nose layer, wherein the second nose layer is longer than the first nose layer and has ends that extend beyond the first nose layer; and folding the extended ends of the second nose layer onto the first panel and the second panel.

4. The method as set forth in claim 3, wherein the folding of the extended ends of the second nose layer is executed by an end effector having a pair of rollers in which the pair of rollers engage the extended ends of the second nose layer and effect the folding of the extended ends of the second nose layer.

5. The method as set forth in claim 2, wherein the first panel and the second panel have filaments that extend in a width direction, and further comprising cutting the first panel and the second panel without cutting the filaments, wherein the cutting of the first panel and the second panel occurs after the placing of the first nose layer onto the first panel and the second panel.

6. The method as set forth in claim 1, further comprising:

providing a nose assembly fixture;

placing a nose onto the nose assembly fixture;

folding the first panel and the second panel onto the nose while the nose is located on the nose assembly fixture.

7. The method as set forth in claim 1, wherein the cutting is performed by a laser cutter and the separating is effected by a wedge profiled partition and multidirectional rollers.

8. A method to assemble an uncured spoke, comprising:

providing a subassembly of a first foot layer, a second foot layer, and a panel;

providing a first foot;

providing a second foot;

placing the first foot and the second foot onto the panel such that the panel extends continuously from the first foot to the second foot, wherein the first foot and the second foot engage the panel;

folding the first foot layer onto the first foot, wherein the first foot layer engages the panel and wherein the first foot layer engages the first foot; and folding the second foot layer onto the second foot;

wherein the placing of the first foot and the second foot onto the panel is executed on a primary conveyor.

9. The method as set forth in claim 2, wherein the placing of the first foot and the second foot onto the panel is executed on a primary conveyor, and wherein the placing of the first nose layer onto the first panel and the second panel is executed on a secondary conveyor.

10. The method as set forth in claim 5, further comprising an indexing feature that receives the first panel, the second panel, the first nose layer, the first foot, and the second foot after the cutting of the first panel and the second panel, wherein the indexing feature moves back and forth in a length direction with the first panel, the second panel, the first nose layer, the first foot, and the second foot thereon.

11. The method as set forth in claim 1, further comprising transporting the assembled uncured spoke to a mold for curing.

* * * * *